(12) United States Patent
Golle

(10) Patent No.: US 9,218,623 B2
(45) Date of Patent: Dec. 22, 2015

(54) SYSTEM AND METHOD FOR PROVIDING PRIVATE STABLE MATCHINGS

(75) Inventor: Philippe Jean-Paul Golle, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 2373 days.

(21) Appl. No.: 11/347,887

(22) Filed: Feb. 6, 2006

(65) Prior Publication Data

US 2007/0150404 A1 Jun. 28, 2007

Related U.S. Application Data

(60) Provisional application No. 60/755,013, filed on Dec. 28, 2005.

(51) Int. Cl.
*G06Q 20/00* (2012.01)
*G06Q 40/04* (2012.01)

(52) U.S. Cl.
CPC ..................... *G06Q 40/04* (2013.01)

(58) Field of Classification Search
USPC .......................................................... 705/74
See application file for complete search history.

(56) References Cited

U.S. PATENT DOCUMENTS

| | | | | |
|---|---|---|---|---|
| 5,931,947 A * | 8/1999 | Burns et al. | | 726/4 |
| 6,112,181 A * | 8/2000 | Shear et al. | | 705/1 |
| 6,378,071 B1 * | 4/2002 | Sasaki et al. | | 713/165 |
| 6,985,582 B1 * | 1/2006 | Sano et al. | | 380/42 |
| 2002/0082978 A1 * | 6/2002 | Ghouri et al. | | 705/37 |
| 2002/0169706 A1 * | 11/2002 | Chandra et al. | | 705/37 |

OTHER PUBLICATIONS

Golle, "A Private Stable Matching Algorithm," 2006, all pages.*
Golle et al., "Univeral Re-encryption for Mixnets," 2004, all pages.*
Golle et al., "Universal Re-encryption for Mixnets," Proceedings of RSA 2004, Cryptographer's Track, 2004, all pages.*
Brito et al., "Distributed Stable Marriage Problem," Conference Paper, Distributed Constraint Reasoning (DCR05) Proceedings of the Sixth International Workshop Edinburgh, Scotland, Jul. 30, 2005, IJCAI, p. 135-147 (2005).*
Kavitha et al., "Strongly Stable Matchings in Time O(nm) and Extension to the Hospitals-Residents Problem," Springer-Verlag Berlin Heidelberg, 2004, pp. 1-12.*
Silaghi, "Using Secure DisCSP Solvers for Generalized Vickrey Auctions," 2005—In IJCAI05 DCR Workshop.*
Manlove et al., "Hard Variants of stable marriage," Elsevier Science B.V., 2002.*

(Continued)

*Primary Examiner* — Jacob C. Coppola
(74) *Attorney, Agent, or Firm* — Patrick J. S. Inouye; Makiko Coffland; Krista A. Wittman (57) ABSTRACT

A system and method for providing private stable matchings is presented. At least one set of matcher preferences for an active participant and at least one set of matchee preferences for a passive participant are accumulated. Private stable matched bids from the at least one matcher preferences set and the at least one matchee preferences set are privately generated. At least one of the private matched bids is decrypted as a stable matching, which is presented to one of the passive participant and the active participant identified in the decrypted stable matching.

20 Claims, 7 Drawing Sheets

(56) References Cited

OTHER PUBLICATIONS

Silaghi, "Incentive Auctions and Stable Marriages Problems Solved with [n2] —Privacy of Human Preferences," Technical Report CS-2004-11, Florida Institute of Tech., Jul. 8, 2004.*
Franklin et al., "Improved Efficiency for Private Stable Matching," Dept. of Computer Science, University of Califorinia, Davis, to appear in CT-RSA 2007.*
Silaghi, "Solving a distributed CSP with cryptographic multi-party computations, without revealing constraints and without involving trusted servers," Florida Institute of Tech., May 23, 2003.*
Silaghi et al., "Desk-mates (Stable Matching) with Privacy of Preferences, and a new Distributed CSP Framework," Proceedings of the Eighteenth International Florida Artificial Intelligence Research Society Conference, Clearwater Beach, Florida. May 15-17, 2005, Published by the AAAI Press, Menlo Park, California.*
Subramanian, "A New Approach to Stable Matching Problems," Dept. of Computer Science, Stanford University, 1989.*
EPSRC research project GR/M13329, "Stable Matching Algorithms," 2000.*
Teo et al., "Gale-Shapley Stable Marriage Problem Revisited: Strategic Issues and Applications (Extended Abstract)," Springer-Verlag Berlin Heidelberg, 1999.*
Irving, "Matching Medical Students to Pairs of Hospitals: A New Variation on a Well-known Theme," Univ. of Glascow, Scotland, Springer-Verlag Berlin Heidelberg, 1998.*
Silaghi, "Meeting Scheduling Guaranteeing n/2-Privacy and Resistant to Statistical Analysis (Applicable to any DisCSP)," IEEE Computer Society, Washington, D.C., 2004.*
Gent et al., "A Constraint Programming Approach to the Stable Marriage Problem," Springer-Verlag Berlin Heidelberg, 2001.*
Silaghi, "A faster technique for distributed constraint satisfaction and optimization with privacy enforcement," Florida Inst. of Tech., Technical Report CS-2004-01, Jan. 16, 2004.*
Mairson, "The Stable Marriage Problem," orginally appeared in "The Brandeis Review," vol. 12, No. 1 (Summer 1992).*
D. Gale et al., "College Admissions and the Stability of Marriage," Am. Math. Monthly (1962).
P. Paillier, "Public-Key Cryptosystems Based on Composite Degree Residuosity Classes," Proc. of Eurocrypt 1999, pp. 223-238, Springer Verlag (1999).
I. Damgard et al., "A Generalization, a Simplification and Some Applications of Paillier's Probabilistic Public Key System," Proc. of Public Key Crypto. 2001, pp. 119-136, Springer Verlag (2001).
P.A. Fouque et al., "Sharing Decryption in the Context of Voting or Lotteries," Proc. of Finan. Crypto. 2000, pp. 90-104 (2000).
W. Ogata et al., "Fault Tolerant Anonymous Channel," Proc. of ICICS '97, pp. 440-444 (1997).
M. Jakobsson et al., "Making Mix Nets Robust for Electronic Voting by Randomized Partial Checking," Proc. of Usenix '02, pp. 339-353 (2002).
A. Neff, "A Verifiable Secret Shuffle and Its Application to E-Voting," Proc. of ACM CCS '01, pp. 116-125 (2001).
M. Jakobsson et al., "Efficient Oblivious Proofs of Correct Exponentiation," Proc. of CMS '99 (1999).
O. Baudron et al., "Practical Multi-Candidate Election System," Proc. of the ACM PODS 2001, pp. 274-283 (2001).
R. Cramer et al., "Proofs of Partial Knowledge and Simplified Design of Witness Hiding Protocols," Proc. of Crypto. 1994 (1994).

\* cited by examiner

SYSTEM AND METHOD FOR PROVIDING PRIVATE STABLE MATCHINGS

CROSS-REFERENCE TO RELATED APPLICATION

This non-provisional patent application claims priority under 35 USC §119(e) to U.S. provisional patent application Ser. No. 60/755,013, filed Dec. 28, 2005, the disclosure of which is incorporated by reference.

FIELD

This application relates in general to stable matching protocols and, in particular, to a system and method for providing private stable matchings.

BACKGROUND

Forming matches between competing interests involves balancing individual preferences, which can be challenging, particularly when only a finite number of choices are available. In general, matches formed without factoring in the preferences of each participant carry the potential to be unstable, that is, the participants might later revisit their matches to attempt new matches more compatible with their own preferences. A stable match eliminates the possibility that participants might later attempt to change their matches by ensuring that no two parties will both have an incentive to break their existing matches to form a new match. Stable matches are often formed for real world applications, such as to match graduating medical students to residency programs at hospitals or to assign students to schools and universities.

Frequently, a neutral third party is engaged to form stable matches to ensure fairness and impartiality. Each participant must reveal their preferences to the third party at the expense of complete privacy. This sharing of preferences implicates a significant level of trust in the third party to keep the preferences confidential, particularly when the stable matches are based on a participant's least preferred choices. At best, the use of a trusted third party is a compromise, as complete privacy can only be ensured by preventing the third party from learning more about each participants' preferences than could otherwise be inferred by an outsider from the resulting stable match.

Moreover, encrypting communications in-transit between the participants and the third party fails to lessen the trust that the participants must place in the third party. Encrypting the communications only protects participants' preferences from eavesdroppers and the third party must still be trusted to keep the preferences private, even if no one else is able to learn the preferences. As a result, encryption alone fails to guarantee complete privacy, where no other parties, not even the third party, know the participants' preferences.

The revelation of participants' preferences presents a potential for abuse, whether the preferences are obtained from the third party through artifice or legitimate means. For example, knowledge of other participants' preferences could enable a dishonest participant to game the matching by biasing their own preferences to influence the outcome. Furthermore, placing all of the trust in a single third party is inherently risky and violates the basic security tenet that trust should be shared among multiple parties. Distributing trust helps to minimize the influence that can be asserted by any individual participant due to, for example, inequities in interests or power.

The Gale-Shapley stable matching algorithm, such as described in D. Gale and H. Shapley, "College Admissions and the Stability of Marriage," Am. Math. Monthly (1962), the disclosure of which is incorporated by reference, presents one particularly well-known solution to forming stable matches using a trusted third party, which is described in the context of one-to-one matchings of men and women in marriage engagements. Every man and woman first ranks their respective preferences of women and men, with no ties allowed. The two groups of participants are all initially "free," that is, unmatched. Arbitrarily, men propose to women. As long as at least one man remains unmatched, men are iteratively matched to the woman that they most prefer and to whom they have not previously attempted an engagement. If the woman is available, the man and woman are matched and move to the group of matched couples. Otherwise, if the woman is already engaged, she will only break her engagement if she has ranked the new suitor higher than the man to whom she is currently engaged. Her current fiancé will be "dumped" and returned to the group of free, unengaged men and a new couple will be formed. Although guaranteed to result in a set of stable matchings, the Gale-Shapley algorithm generates residual information at the termination of the algorithm that includes the complete lists of preferences for both sides and the histories of matches made and broken.

Therefore, there is a need for providing stable matches without revealing any information, either interim or upon completion, other than the final matches formed. Preferably, such an approach would be divisible among multiple cooperating matchmaking parties to avoid an over concentration of trust.

There is a further need for forming stable matches through one or more third parties that ensures complete privacy to participants by preventing the third parties from learning more about the participants' preferences than could otherwise be inferred by an outsider from the stable match.

SUMMARY

Existing stable matching algorithms using a trusted third party can reveal the preferences of all participants, as well as the history of matches made and broken during the course of determining a stable match. This potential information leakage not only violates the privacy of the participants, but also leaves matching algorithms vulnerable to manipulation. In one embodiment, a private stable matching algorithm is run by a number of independent third parties, called Matching Authorities. As long as a majority of the Matching Authorities are honest, the algorithm correctly outputs stable matches and reveals no other information to the third parties than could be learned from the resulting stable matches and the preferences of participants controlled by the adversary. Security and privacy are based on re-encryption mix networks and on an additively homomorphic and semantically secure public-key encryption scheme, such as provided by Paillier encryption schemes.

One embodiment provides a system and method for providing private stable matchings. At least one set of matcher preferences for an active participant and at least one set of matchee preferences for a passive participant are accumulated. Private stable matched bids from the at least one matcher preferences set and the at least one matchee preferences set are privately generated. At least one of the private matched bids is decrypted as a stable matching, which is presented to one of the passive participant and the active participant identified in the decrypted stable matching.

A further embodiment provides a system and method for providing private stable matchings through a re-encryption mix network. Preferences are encrypted. Preferences for a set of active participants, including one unique preference for each participant in a set of passive participants, are encrypted. Preferences for a set of pseudo participants, including one unique preference for each participant in the set of passive participants, are encrypted. Preferences for a set of passive participants, including one unique preference for each participant in the set of active participants and one unique preference for each participant in the set of pseudo participants, are encrypted, such that each pseudo participant preference is less preferred than each matcher preference. Bids are created. A set of unmatched bids are formed, initially including the encrypted preferences for each participant in the set of active participants. A set of matched bids are formed, initially including the encrypted preferences and the preference of the passive participant identified in one of the encrypted preferences for each participant in the set of pseudo participants. An initial mixing is performed. The set of unmatched bids and the set of matched bids are externally mixed independently. A union of the set of unmatched bids and the set of matched bids are internally mixed. For the number of participants in the set of active participants, a stable match for one of the passive participants is determined, while the set of unmatched bids remains non-empty. Encrypted rankings for each internal mixing of the encrypted preferences in the set of unmatched bids are maintained. One unmatched bid from the set of unmatched bids is selected and the encrypted preference and the preference of the passive participant identified in the encrypted preference in the selected unmatched bid are learned based on the encrypted rankings. A conflict between the selected unmatched bid and one matched bid in the set of matched bids that includes the encrypted preference that identifies the same passive participant that is identified in the encrypted preference is resolved. One of the unmatched bid and the matched bid is assigned to the set of matched bids and the other bid is assigned to the set of unmatched bids for a next stable match. The set of matched bids is designated as the set of matched bids for the next stable match. An interim mixing is performed. The set of matched bids is externally mixed. A union of the set of matched bids, the set of unmatched bids for the current stable match, and the set of unmatched bids for the next stable match are internally mixed. A final mixing is performed when the set of unmatched bids becomes empty. The set of matched bids for the next stable match and the set of unmatched bids for the next stable match are externally mixed independently. A union of the set of matched bids for the next stable match and the set of unmatched bids for the next stable match are internally mixed. The set of matched bids for the last stable match is externally mixed. The preferences in the set of matched bids are decrypted to identify the passive participants stably matched to the active participants.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Components

Figure 1:
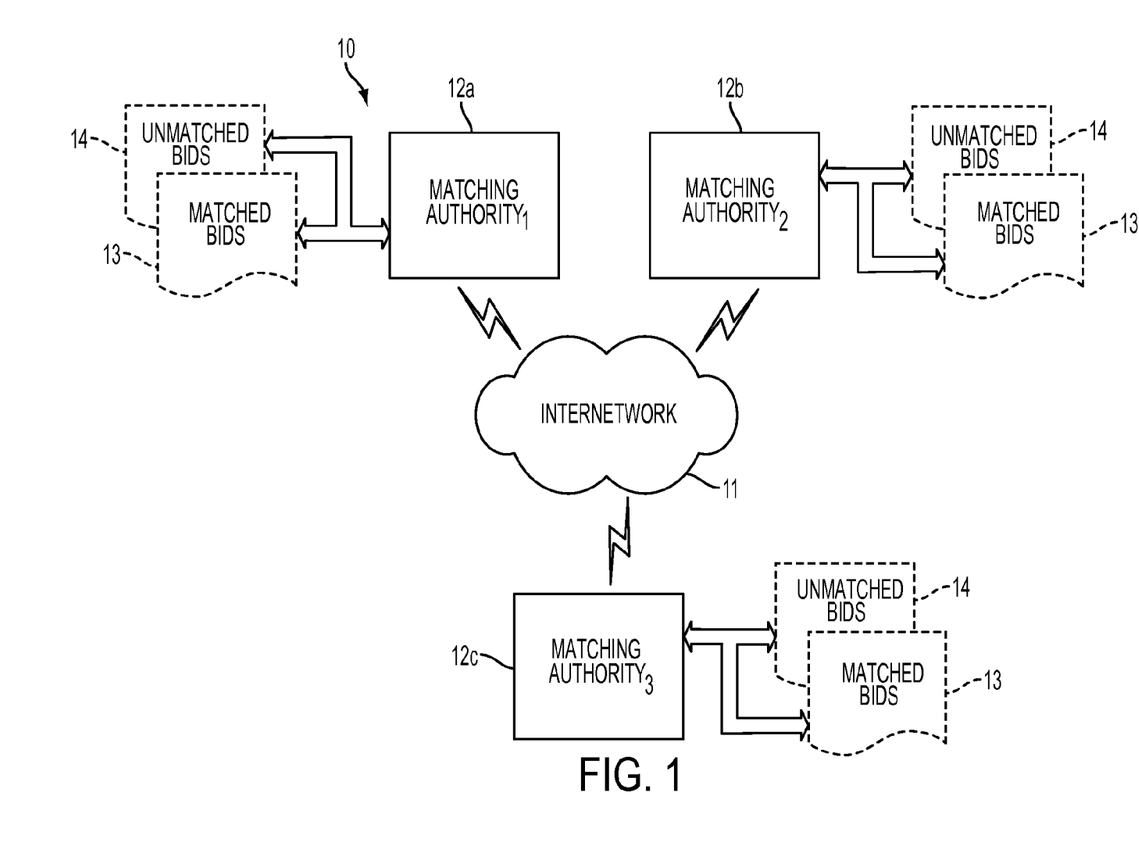
FIG. 1 is a block diagram showing, by way of example, components for providing private stable matchings, in accordance with one embodiment.

To avoid an over concentration of trust in a single third party, the stable matching of participants can be performed by multiple independent parties, known as Matching Authorities. FIG. 1 is a block diagram showing, by way of example, components 10 for providing private stable matchings, in accordance with one embodiment. The components 10 include a plurality of matching authorities 12$a$-$c$, which are interconnected over a network infrastructure, such as an internetwork 11, including the Internet. All of the matching authorities 12$a$-$c$ need not be connected to the same network and combinations of disparate networks are possible. In one embodiment, the network is a Transmission Control Protocol/Internet Protocol (TCP/IP) compliant network. The network can also provide gateways to external networks. Other types, configurations, and arrangements of networks are possible.

The matching authorities 12$a$-$c$ operate on a single set of matched bids 13 and unmatched bids 14. The matched bids 13 and unmatched bids 14 are jointly formed as interim results while stable matching is independently performed, as further described below beginning with reference to FIGS. 7A-B, et seq. Upon the completion of the stable matching, only a final set of matched bids 13 is output. In contrast to existing stable matching algorithms, all prior histories of interim matches, both broken and kept, as well as the preferences of each participant (not shown), remain encrypted, thereby revealing no information about the matches formed. As a result, the matching authorities are prevented from learning more about the participants' preferences than could otherwise be inferred by an outsider from the stable match and complete participant privacy is assured.

Preferably, the matching authorities 12$a$-$c$ are general-purpose computing systems, which execute software programs and include components conventionally found in a computing device, such as, for example, a central processing unit, memory, network interface, persistent storage, and various interfaces for interconnecting these components. Other components are possible.

Example Stable Matching Problem

The several formulations of the stable matching problem are all closely related. For ease of discussion, the same context of matchings of men and women in marriage engagements as used to describe the classic Gale-Shapley algorithm is used here, although the described stable matching techniques could be applied equally to other problem domains that similarly require balancing of the competing interests of individual participants to arrive at a set of stable matches. FIGS. 2-5 are diagrams 20, 25, 30, 35 showing, by way of example, the stable matching problem. Here, a model of stable one-to-one matchings, that excludes polygamy, and uses complete preference lists is employed. The stable matching techniques can be adapted to other models. For example, the many-to-one model, such as where one hospital has internship slots for multiple medical students, can be reduced to a one-to-one model by cloning the participants who accept multiple partners an appropriate number of times.

Figure 2:
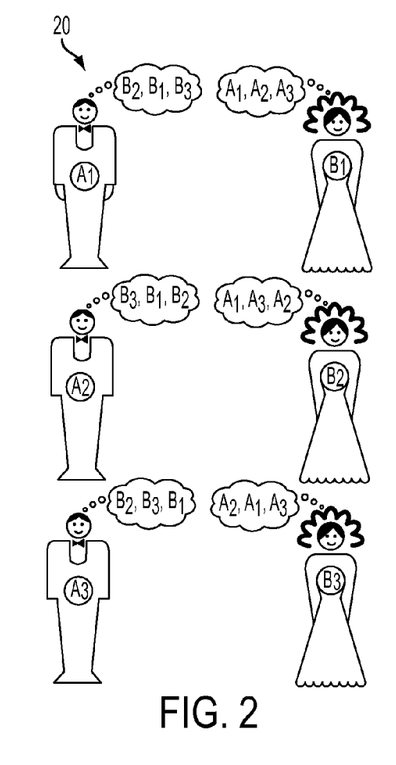
FIGS. 2-5 are diagrams showing, by way of example, the stable matching problem.
Figure 3:
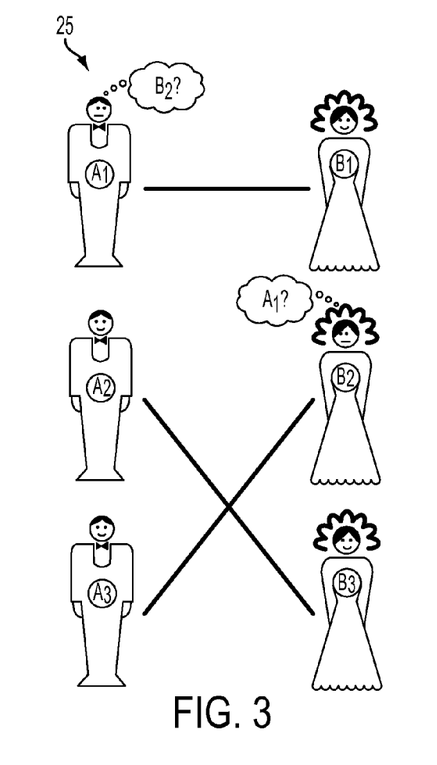
Figure 4:
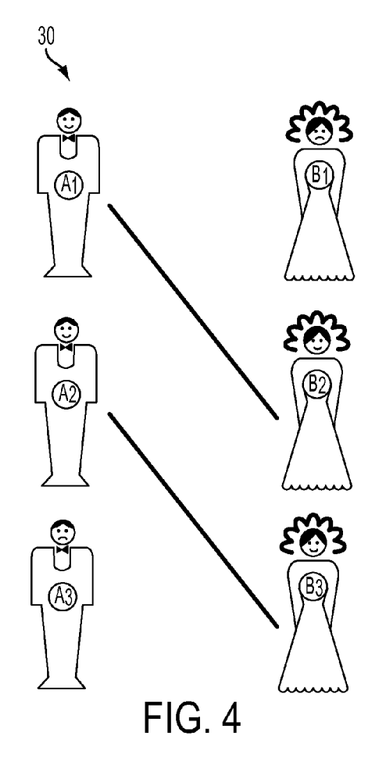

The Gale-Shapley algorithm forms stable matches, which can be better understood with reference to an unstable match. Referring first to FIG. 2, a group of unengaged men $A_1, A_2, A_3$ and a group of unengaged women $B_1$, $B_2$, $B_3$ are to be matched. Every man $A_1, A_2, A_3$ ranks all women and every woman $B_1$, $B_2$, $B_3$ ranks all men, with no ties allowed by either. Thus, Man $A_1$ ranks women $B_2, B_1, B_3$ as his order of preferences, while Woman $B_1$ ranks men $A_1, A_2, A_3$ as her order of preferences. Referring next to FIG. 3, the men $A_1, A_2, A_3$ and women $B_1, B_2, B_3$ have been matched by pairing men $A_2$ and $A_3$ with their highest ranked women, $B_3$ and $B_3$, respectively, and man $A_1$ has been paired with the only remaining unengaged Woman $B_1$. The preferences of Man $A_1$ and the preferences of all of the women $B_1, B_2, B_3$ have been ignored and Man $A_1$ is unsettled. He colludes with his highest ranked woman, Woman $B_2$, and together they realize that they have both ranked each other higher than the partner to whom they are respectively matched, Man $A_3$ and Woman $B_1$. Thus, an incentive to break their engagement exists and the matches are unstable. Referring next to FIG. 4, Man $A_1$ and Woman $B_2$ break their engagements and form a new match with each other, thereby leaving their former partners, Man $A_3$ and Woman $B_1$, unengaged. The Gale-Shapley algorithm addresses the problem of unstable matches by removing incentives to break matches.

In the Gale-Shapley algorithm, men and women play different roles. Arbitrarily, men propose to women, although these roles can be reversed. The algorithm takes as input the lists of preferences of men and women. Every man ranks all women and every woman ranks all men, with no ties allowed by either. Throughout the algorithm, men and women are divided into two groups: those men and women who are engaged, and those that are free, that is, not yet or no longer engaged.

Initially, all men $A_{1-3}$ and all women $B_{1-3}$ are free. As long as the group of free men is non-empty, the algorithm selects at random one man A from the group of free men. Man A proposes to the woman B whom he ranks the highest among the women to whom he has never proposed before. One of three outcomes may occur following the proposal:
  (1) Woman B is free. Man A and Woman B are engaged to each other and they move to the group of engaged couples.
  (2) Woman B is already engaged to Man A' and she ranks Man A ahead of Man A'. Woman B breaks her engagement to Man A' and instead gets engaged to Man A. Man A and Woman B join the group of engaged couples, whereas Man A' goes back to the group of free men.
  (3) Woman B is already engaged to Man A' and ranks Man A' ahead of Man A. Woman B stays engaged to Man A' and Man A stays in the group of free men.

Figure 5:
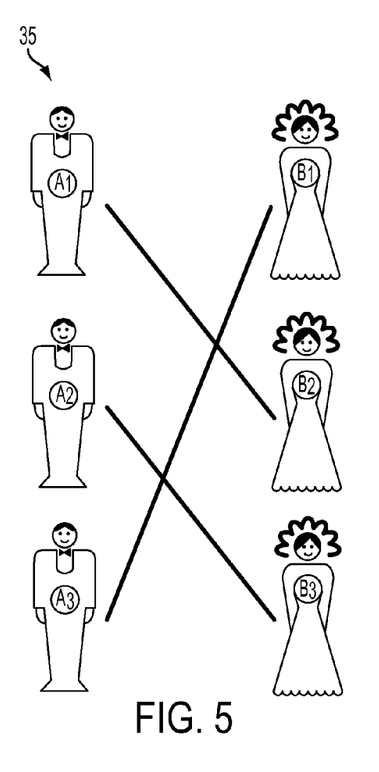

Referring finally to FIG. 5, the men $A_1, A_2, A_3$ and women $B_1$, $B_2$, $B_3$ have been matched by applying the Gale-Shapley algorithm to pair men $A_1, A_2$, and $A_3$ with their women $B_2, B_3$, and $B_1$, respectively. Although the pairing of Man $A_3$ with Woman $B_1$ was made based on each partners' lowest ranked preference, the incentive for any other woman or man to break their own engagements has been removed. Thus, Man $A_3$ would not be able to convince either Woman $B_2$ or Woman $B_3$ to break their engagements, as they are both matched to men that they have ranked higher than Man $A_3$. As a result, the matches are stable.

Properties and Limitations of the Gale-Shapley Algorithm

Let n denote the number of men and women. The Gale-Shapley algorithm terminates in at most $n^2$ steps and outputs a set of matches that are stable using a matchmaking third party. This "men-propose" algorithm is men-optimal, that is, the optimal strategy for a man is to reveal his true preference list, as long as all other participants also reveal their true preferences. Complete privacy is not assured, as the third party must be trusted to keep the preferences confidential.

Moreover, assuming women gain full knowledge of the preference lists of all participants, in men-propose algorithms, each woman will thus have an incentive to falsify her preferences, whether the preferences are obtained from the third party through artifice or legitimate means. The Gale-Shapley algorithm reveals all of the knowledge women need to manipulate the algorithm, since the algorithm exposes the complete preference lists of all men and women, together with the entire history of engagements made and broken. Encrypting communications between each man and the trusted third party and between each woman and the trusted third party only protects participants' preferences from eavesdroppers. The third party must still be trusted to keep the preferences private, even if no one else is able to learn the preferences.

Private Stable Matching

Figure 6:
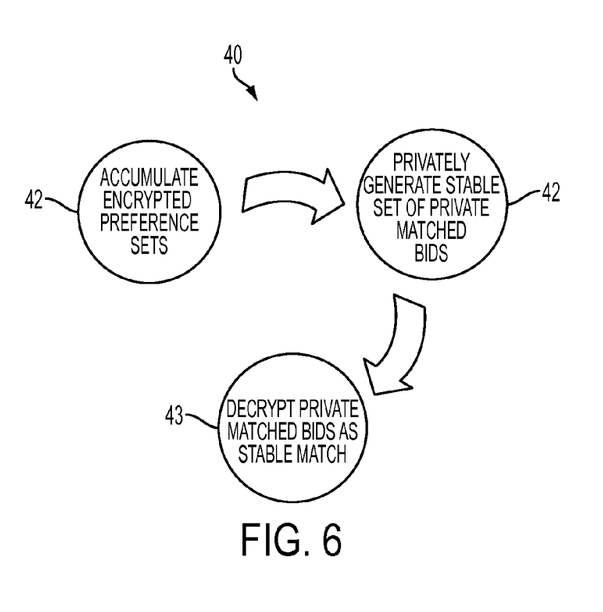
FIG. 6 is a process flow diagram showing private stable matching.

Private stable matching provides stable matchings without revealing any information, either interim or upon completion, other than the final matches formed. Complete participant privacy is assured. Third parties do not learn any more about the participants' preferences than could otherwise be inferred by an outsider from the stable match. FIG. 6 is a process flow diagram 40 showing private stable matching. One or more matchmaking third parties accumulate encrypted preference sets from both active and passive participants (operation 41). "Active" participants are the participants that are actively matched to other "passive" participants based on the preferences of the active participants. The matchmaking third parties privately generate stable sets of private matched bids (operation 42), each of which can be decrypted by a quorum of all the matchmaking third parties as a stable match (operation 43). In a further embodiment, the matchmaking third parties can also privately generate stable sets of private unmatched bids for non-existent, place holding "participants," which are considered to be pseudo participants. As the preference sets, stable bids, and history of engagements made and broken are kept anonymous and encrypted, the matchmaking third parties do not learn any information about the participants or their preferences by virtue of having created the private matched bids sets.

Figure 7A:
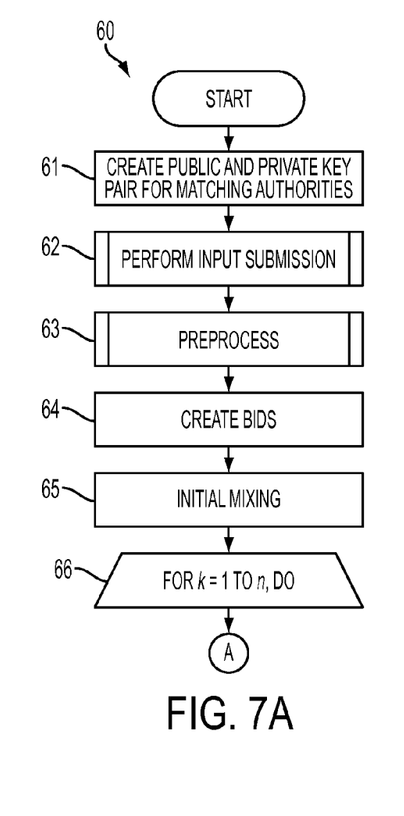
FIGS. 7A-B are flow diagrams showing a method for providing private stable matchings, in accordance with one embodiment.
Figure 7B:
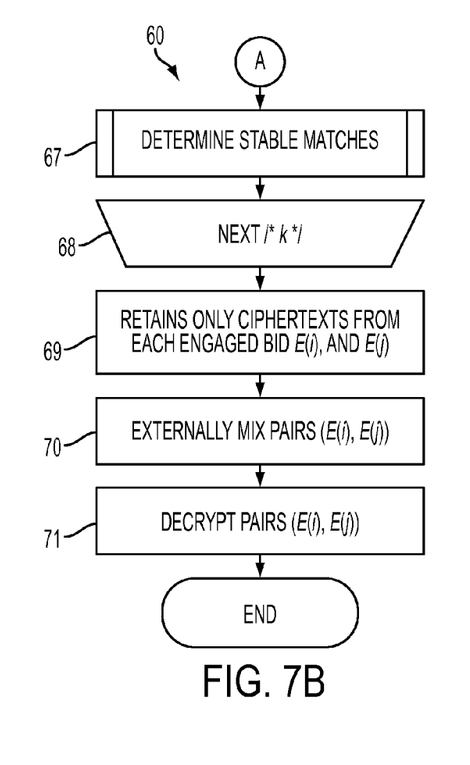

In one embodiment, the private stable matching algorithm is jointly run by a plurality of Matching Authorities 12a-c (shown in FIG. 1). As long as a majority of the Matching Authorities are honest, the algorithm correctly outputs stable matches and reveals no other information to the third parties than could be learned from the resulting stable matches and the preferences of participants controlled by the adversary. FIGS. 7A-B are flow diagrams showing a method 60 for providing private stable matchings, in accordance with one embodiment. The matching authorities 12a-c collectively run a number of distributed cryptographic protocols, such as distributed key generation, re-encryption mix networks, oblivious tests of plaintext equalities, and so forth. These protocols serve as building blocks, as further described below.

The security and privacy provided reduces to the security and privacy of the underlying cryptographic building blocks. An adversarial model can be defined loosely as the intersection of the adversarial models of the building blocks. For simplicity, the private stable matching results assume an "honest-but-curious" adversary. More precisely, we consider a static adversary who has passive control of up to all of the participants, both men and women, and passive control of up to all, but one of the matching authorities. The method 60 can be extended to accommodate active adversaries, as further discussed below.

Definition 1. (Private Stable Matching Algorithm)

An algorithm for computing a stable match is private if the algorithm outputs a stable match and reveals no other information to the adversary than what the adversary can learn from that match and from the preferences of the participants that the adversary controls.

Hiding Internal State

The method 60 hides internal state, such as the number of men and women free and engaged at any given time, and the history of engagements made and broken. As a result, the matching authorities 12a-c are unable to learn any more about the participants' preferences than could otherwise be inferred by an outsider. For ease of discussion in the context of private stable matching, the method 60 is first discussed in non-private form. The method 60 takes as input the lists of preferences of n men and n women and outputs a stable match between them. The men are considered to be active participants, while the women are considered to be passive participants. The terms "active participants" and "passive participants" are for notational convenience and other terms denoting the respective roles played by participants to a stable matching could be used. The following definitions apply.

Rankings.

Let $A_1, \ldots, A_n$ denote n men and $B_1, \ldots, B_n$ denote n women. Every man ranks the women from most to least desired. Thus, a man assigns rank 0 to the woman whom he likes best, rank 1 to his second place favorite, and so on to assign rank n−1 to the woman whom he likes the least. The rankings do not allow for ties. Similarly, every woman assigns ranks to men from 0, which is her most favorite man, to n−1, which is her least favorite man. Being ranked ahead of a person means being assigned a lower rank, and thus being preferred over that other person. Being ranked behind a person means being assigned a higher rank, and thus being less desired than that other person.

Notations.

The preference of man $A_i$ is a vector $a_i = (r_{i,1}, \ldots, r_{i,n})$, where $r_{i,j} \in \{0, n-1\}$ is the rank of woman $B_j$ for man $A_i$. Similarly, the preference of woman $B_j$ is a vector $b_j = (s_{j,1}, \ldots, s_{j,n})$ where $s_{j,i} \in \{0, \ldots, n-1\}$ is the rank of man $A_i$ for woman $B_j$. The method 60 takes as inputs the vectors $a_1, \ldots, a_n$ and $b_1, \ldots, b_n$.

Preprocessing.

First, an additional n "fake" men, denoted $A_{n+1}, \ldots, A_{2n}$ are introduced. The fake men are considered to be pseudo participants. The term "pseudo participants" is for notational convenience and other terms denoting the role played by participants to a stable matching could be used. No fake women are defined. The preferences of fake men for women are unimportant to the method. Arbitrarily, $a_i = (0, 1, \ldots, n-1)$ for $i = n+1, \ldots, 2n$. The preferences $b_j$ of women must be augmented to reflect the addition of the fake men. As long as women rank all fake men behind all real men, their preferences are unimportant to the method.

Arbitrarily, every woman $B_j$ assigns rank $s_{j,i} = i - 1$ to man $A_i$ for $i = n+1, \ldots, 2n$. We let $b_j$ denote the vector of 2n elements that encodes the augmented preference of woman $B_j$. After preprocessing, there are 2n vectors $a_1, \ldots, a_{2n}$, where each vector contains n elements that express the rankings assigned by one man to the n women, and n vectors $b_1, \ldots, b_n$, where each vector contains 2n elements that express the rankings assigned by one woman to the 2n men. The introduction of fake men, and the corresponding update of preferences, is done entirely by the method 60 without any involvement from real men or real women.

Computing a Stable Match.

The method 60 proceeds in n rounds. $E_k$ denote the set of engaged men and $F_k$ denotes the set of free men at the beginning of round $k = 1, \ldots, n+1$. There are only n rounds; however, $F_{n+1}$ and $E_{n+1}$ respectively denote the sets of free and engaged men at the end of the last round. Initially, all real men are free $F_1 = \{A_1, \ldots, A_n\}$, that is, unmatched, and all fake men are engaged $E_1 = \{A_{n+1}, \ldots, A_{2n}\}$, that is, matched. Arbitrarily, fake man $A_{n+i}$ is initially engaged to women $B_i$. The other sets are initially empty, where $E_k = F_k = \emptyset$ for $k > 1$. For $k = 1, \ldots, n$, the method executes the following:

(1) While the set $F_k$ is non-empty, select at random one man, $A_i$, from $F_k$. $A_i$ proposes to the woman, $B_j$, whom he ranks highest among the women and to whom he has never proposed before. Woman $B_j$ will always be already engaged to a man $A_{i'}$, for some $i' \neq i$. One of two outcomes may occur:

(a) If $B_j$ ranks $A_i$ ahead of $A_{i'}$, $B_j$ breaks her engagement to $A_{i'}$ and becomes engaged to $A_i$. Man $A_i$ is removed from the set $F_k$ and added to $E_k$, whereas man $A_{i'}$ is removed from $E_k$ and added to $F_{k+1}$.

(b) If $B_j$ ranks $A_i$ behind $A_{i'}$, she stays engaged to $A_{i'}$. Man $A_i$ is removed from set $F_k$ and added to set $F_{k+1}$.

(4) When $F_k$ is empty, $E_{k+1} = E_k$.

The method terminates after n rounds and outputs the set $E_{n+1}$ of engaged men and their current partners.

Invariants.

The algorithm preserves certain invariants. All n women are always engaged to some man. During round k, the number of engaged men is always exactly $|E_k| = n$. Engaged men do not move progressively from set $E_k$ to set $E_{k+1}$ during round k, but rather they move all at once at the end of round k. Every time a new proposal is made, the cardinality of $F_k$ decreases by one, the cardinality of $F_{k+1}$ increases by one, and the cardinality of $E_k$ is unchanged, irrespective of whether a woman changes partner.

Proposition 1.

The stable matching method outputs a stable match between the n real men $A_1, \ldots, A_n$, and the n women $B_1, \ldots, B_n$.

Cryptographic Building Blocks

The method 60 uses cryptographic building blocks, which are now described briefly. These building blocks are all standard distributed cryptographic algorithms run jointly by the matching authorities 12a-c.

Threshold Paillier Encryption.

Paillier encryption schemes, such as described in P. Paillier, "Public-Key Cryptosystems Based on Composite Degree Residuosity Classes," *Proc. of Eurocrypt* 1999, pp. 223-238, Springer Verlag (1999), the disclosure of which is incorporated by reference, allows for threshold encryption, such as further described in I. Damgård and M. Jurik, "A Generalization, a Simplification and Some Applications of Paillier's Probabilistic Public Key System," *Proc. of Public Key Crypto.* 2001, pp. 119-136, Springer Verlag (2001) and P. A. Fouque et al., "Sharing Decryption in the Context of Voting or Lotteries," *Proc. of Finan. Crypto.* 2000, pp. 90-104, (2000), the disclosures of which are incorporated by reference. Here, all ciphertexts are encrypted with a threshold version of Paillier encryption schemes. The matching authorities 12a-c hold shares of the corresponding decryption key, such that a quorum consisting of all parties can decrypt.

Robust Re-Encryption Mix Network.

A re-encryption mix network re-encrypts and permutes a number of input Paillier ciphertexts, such as described in W. Ogata et al., "Fault Tolerant Anonymous Channel," *Proc. of ICICS '97*, pp. 440-444 (1997), the disclosure of which is incorporated by reference. The matching authorities 12*a-c* play the role of mix servers. If active adversaries, described below, are allowed, robust re-encryption mix networks must be used, such as described in M. Jakobsson et al., "Making Mix Nets Robust for Electronic Voting by Randomized Partial Checking," *Proc. of USENIX '02*, pp. 339-353 (2002) and A. Neff, "A Verifiable Secret Shuffle and Its Application to E-Voting," *Proc. of ACM CCS '01*, pp. 116-125 (2001), the disclosures of which are incorporated by reference. Saying that the matching authorities "mix" a set of inputs according to a permutation $\pi$ means that the matching authorities run the set of inputs through a mix network and $\pi$ denotes the global, secret permutation, which is not known to the matching authorities.

Oblivious Test of Plaintext Equality.

Let $E(m_1)$ and $E(m_2)$ be two Paillier ciphertexts. A protocol for ElGamal, such as described in M. Jakobsson and C. Schnorr, "Efficient Oblivious Proofs of Correct Exponentiation," *Proc. of CMS '99* (1999), the disclosure of which is incorporated by reference, also works for Paillier encryption schemes to let the joint holders of a decryption key determine whether $m_1 = m_2$ without revealing any other information. This protocol is denoted as EQTEST ($E(m_1)$, $E(m_2)$). The protocol outputs either $m_1 = m_2$ or $m_1 \neq m_2$.

Repeated Test of Plaintext Equality.

The protocol INDEX (a, E(p)) takes as input a vector $a = (E(a_1)), \ldots, E(a_n)$ of n Paillier ciphertexts and an additional Paillier ciphertext E(p), such that there exists one and only one value $i \in \{1, \ldots, n\}$ for which $p = a_i$. The protocol outputs the index i, such that $a_i = p$. The protocol INDEX can be implemented trivially with n instances of EQTEST.

Finding the Larger of Two Plaintexts.

Let $E(m_1)$ and $E(m_2)$ be two Paillier ciphertexts, such that $m_1, m_2 \in \{0, \ldots, n-1\}$ and $m_1 \neq m_2$. The protocol COMPARE ($E(m_1)$, $E(m_2)$) outputs TRUE if $m_1 > m_2$, and FALSE otherwise, without leaking any other information. The protocol proceeds as follows. For $i = 1, \ldots, n-1$, the matching authorities 12*a-c* determine ciphertext $D_i = E(m_1 - m_2 - i)$ using Paillier's additive homomorphism. $m_1 > m_2$ if and only if one of the ciphertexts $D_i$ is an encryption of 0. The matching authorities 12*a-c* mix, that is, re-encrypt and permute, the set of ciphertexts $D_1, \ldots, D_{n-1}$. Let $D'_1, \ldots, D'_{n-1}$ denote the mixed set. The matching authorities 12*a-c* then compute EQTEST($D'_i$, E(0)) for $i = 1, \ldots, n-1$. If an equality is found, the matching authorities output TRUE, otherwise they output FALSE.

Encrypting Preferences

Let E denote the encryption function for a threshold public-key encryption scheme with an additive homomorphism, such as a threshold version of the Paillier encryption scheme, described above. Let MA denote the set of joint holders of the private decryption key, called matching authorities.

Let $A_1, \ldots, A_m$ be m men and $B_1, \ldots, B_n$ be n women. Let $r_{i,j} \in \{0, \ldots, n-1\}$ denote the rank of woman $B_j$ for man $A_i$, and $s_{j,i} \in \{0, \ldots, m-1\}$ denote the rank of man $A_i$ for woman $B_j$. $p_{i,j} = E(r_{i,j})$ and $a_i = (p_{i,1}, \ldots, p_{i,n})$. Similarly, $q_{j,i} = E(s_{j,i})$ and $b_j = (q_{j,1}, \ldots q_{j,m})$.

Bid Creation

Bids.

A "bid" is defined as an encrypted representation of the preferences of one man for women, together with additional "bookkeeping" information. For $i \in \{1, \ldots, m\}$, the bid $W_i$ that represents the preferences of man $A_i$ consists of 3n+2 Paillier ciphertexts, defined as follows:

(1) An encryption E(i) of the index i of man $A_i$.
(2) The vector $a_i = (p_{i,1}, \ldots, p_{i,n})$.
(3) A vector $v_i = (E(1), \ldots, E(n))$.
(4) The vector $q_i = (q_{1,i}, \ldots, q_{n,i})$.
(5) A ciphertext $E(\rho)$, where $\rho$ is the number of times the bid has been rejected. Initially, $\rho = 0$.

The role of ciphertext E(i) is to maintain the association between bid $W_i$ and the man $A_i$ whose preferences the bid expresses. The vector $a_i$ encodes the preferences of man $A_i$ for women $B_1, \ldots, B_n$. The elements of $a_i$ are permuted at random in the course of private stable matching. Thus, vector $v_i$ maintains the association between the rankings contained in $a_i$ and the women to whom these rankings pertain: the element in position j of $v_i$ is always an encryption of the index of the woman whose rank is given by the element in position j of $a_i$. The vector $q_i$ encodes the initial rank given to man $A_i$ by women $B_1, \ldots, B_n$. Finally, the ciphertext $E(\rho)$ records the number of times that the bid has been rejected: the value $\rho$ is updated every time an engagement is broken.

Free and Engaged Bids.

A bid by itself, as defined above, is called a free or unmatched bid because the bid is not paired up with a woman. A bid paired up with a woman is called an engaged or matched bid. More precisely, an engaged bid is a triplet ($W_i$, E(j), $q_{j,i}$), where:

(1) $W_i = [E(i), a_i, v_i, q_i, E(p)]$ is the bid of man $A_i$.
(2) E(j) is an encryption of the index $j \in \{1, \ldots, n\}$ of a woman $B_j$.
(3) $q_{j,i}$ is an encryption of the rank given to man $A_i$ by woman $B_j$.

Breaking an Engagement.

Let ($W_i$, E(j), $q_{j,i}$) be an engaged bid. If this bid loses woman $B_j$ to another bid, the bid is updated as follows. First, the triplet is stripped of the values E(j) and $q_{j,i}$, keeping only the free bid $W_i$. Next, the counter $\rho$ in $W_i$ is incremented by one, using Paillier's additive homomorphism, that is, E(p) is multiplied by E(1) to obtain $E(\rho+1)$.

Bid Mixing

The Paillier encryption scheme allows for semantically secure re-encryption of ciphertexts. Since both free and engaged bids include Paillier ciphertexts, the bids can be re-encrypted, and, in particular, can be mixed with a re-encryption mix network, such as described above. The bids can be mixed through "external" and "internal" mixing, as follows.

External Bid Mixing.

External mixing takes as input a set of bids, either all free or all engaged, and mixes them in a way that hides the order of the bids but preserves the internal position of ciphertexts within a bid. External mixing considers bids as atomic elements and preserves their internal integrity. More precisely, let us consider an initial ordering of k free bids $W_1, \ldots, W_k$ and let $\sigma$ be a permutation on k elements. The external mixing operation re-encrypts all the Paillier ciphertexts in all the bids (preserving the order of ciphertexts within each bid) and outputs $W_{\sigma(1)}, \ldots, W_{\sigma(k)}$. A set of engaged bids can be mixed externally in exactly the same way. In this paper, free and engaged bids are never mixed externally together (since free bids are made of 3n+2 ciphertexts and engaged bids of 3n+4, they would not blend together). Intuitively, external bid mixing hides which bid encodes the preferences of which man.

Internal Bid Mixing.

Internal mixing takes as input a set of bids that may contain both free and engaged bids. These bids are mixed "internally" in a way that hides the order of a subset of the ciphertexts within the bids, but preserves the order of the bids themselves. More precisely, consider a set of k bids and let or be a permutation on n elements. The bids in the set are processed one-by-one, and output in the same order as they were given as input.

A free bid is processed as follows. Let $W_i=[E(i), a_i, v_i, q_i, E(p)]$ be a free bid. An internally permuted bid is defined $\pi(W_i)=[E(i), \pi(a_i), \pi(v_i), \pi(q_i), E(p)]$, where the permuted vectors $\pi(a_i)$, $\pi(v_i)$, and $\pi(q_i)$ are defined as follows. Let $a_i=p_{i,1}, \ldots, p_{i,n})$. Let $p'_{i,1}, \ldots, p'_{i,n}$ be re-encryptions of the ciphertexts $p_{i,1}, \ldots, p_{i,n}$. We define $\pi(a_i)=(p'_{i,\pi(1)}, \ldots, p'_{i,\pi(n)})$ The vectors $\pi(v_i)$ and $\pi(q_i)$ are defined in the same way.

Engaged bids are processed in the same way as follows. Let $(W_i, E(j), q_{j,i})$ be an engaged bid. The corresponding internally permuted engaged bid is defined as $(\pi(W_i), E(j), q_{j,i})$.

The same internal permutation π is applied to all the bids in the set. As usual in mix networks, the global permutation π is the combination of permutations chosen by all the matching authorities, so that the matching authorities themselves do not know π, absent collusion. Intuitively, internal mixing hides the woman to whom a particular ciphertext pertains.

Conflicts Between Bids
Opening a Free Bid.

Let $\pi(W_i)=[E(i), \pi(a_i), \pi(v_i), \pi(q_i), E(p)]$ be a free bid that has been internally permuted by a permutation π on n elements. Since π is the result of one or several internal bid mixing operations, π is not known to the matching authorities 12a-c. Let j be the index of the woman $B_j$ assigned rank ρ by that bid. Opening $W_i$ means determining E(j) and $q_{j,i}=E(s_{j,i})$ without learning anything else about the bid. Opening a bid would be trivial if the permutation π were known. However, without knowledge of π, the matching authorities 12a-c must open a bid as follows. First, the matching authorities 12a-c jointly compute α=INDEX($\pi(a_i)$, E(p)). Since the same permutation π is applied to $a_i$, $v_i$, and $q_i$, the element in position α of $\pi(v_i)$ is E(j) and the element in position α of $\pi(q_i)$ is $q_{j,i}=E(s_{j,i})$.

Detecting a Conflict.

Let $\pi(W_i)$ be a free bid, and let $(\pi(W_{i'}), E(j'), q_{j',i'})$ be an engaged bid, both internally permuted according to the same permutation π on n elements, assuming again that π is not known to the matching authorities 12a-c. Let E(j) and $q_{j,i}$ be the ciphertexts obtained when the free bid $\pi(W_i)$ is opened. Detecting a conflict between these two bids means determining whether j=j', without learning anything else about the bids. To detect a conflict, the matching authorities 12a-c jointly compute EQTEST(E(j), E(j')). The bids conflict if and only if EQTEST returns an equality.

Resolving a Conflict.

Let $\pi(W_i)$ be a free bid that opens up to E(j), $q_{j,i}$ and conflicts with an engaged bid $(\pi(W_{i'}), E(j), q_{j,i'})$ for woman $B_j$. Resolving the conflict means outputting a new free bid and a new engaged bid, such that:

(1) If $B_j$ ranks $A_i$ ahead of $A_{i'}$, the free bid is a re-encryption of $W_{i'}$ and the engaged bid is a re-encryption of $(W_i, E(j), q_{j,i})$ (2) If $B_j$ ranks $A_i$ behind $A_{i'}$, the free bid is a re-encryption of $W_i$ and the engaged bid is a re-encryption of $(W_{i'}, E(j), q_{j,i'})$ without revealing anything else about the bids. In particular, the method 60 does not reveal which bid wins the contested woman.

To resolve the conflict, the matching authorities 12a-c first create an engaged bid $(\pi(W_i), E(j), q_{j,i})$ out of the free bid $\pi(W_i)$. The two engaged bids are then mixed externally. Let $q'_{j,i'}$ and $q'_{j,i}$ denote the re-encrypted and permuted images of $q_{j,i'}$ and $q_{j,i}$. The matching authorities jointly compute COMPARE($q'_{j,i'}$, $q'_{j,i}$). The result of this comparison determines privately the bid that stays engaged, and the bid that is stripped of $B_j$ to make a free bid.

Private Stable Matching Method

The method 60 is described in the context of finding a stable matching in which men propose to women. The method 60 operates on encrypted bids to preserve privacy and is run by a number of matching authorities 12a-c.

The method 60 proceeds as follows. A public and private key pair is first created for the matching authorities 12a-c (block 61). Input submission and preprocessing are performed (blocks 62 and 63), as further described below respectively with reference to FIGS. 7A-B and 8.

Bids are created (block 64). The matching authorities create 2n bids $W_1, \ldots, W_{2n}$, where $W_i$ encodes the preferences of man $A_i$. Each bid $W_i$ is defined as $W_i=[E(i), a_i, v_i, q_i, E(0)]$. Bids are divided into free, or unmatched, bids and engaged, or matched, bids. Initially, the n bids corresponding to real men are free, where $F_1=(W_1, \ldots, W_n)$, whereas the n bids corresponding to the fake men are engaged, where $E_1=(W_{n+1}, \ldots, W_{2n})$. More precisely, man $A_{n+j}$ is paired with woman $B_j$. For j=1, ..., n, the engaged bid of a fake man $A_{n+j}$ is thus defined as $(W_{n+j}, E(j), q_{j,n+j})$.

The bids are initially mixed (block 65). The sets $E_1$ and $F_1$ are each independently mixed externally and the set $E_1 \cup F_1$ is internally mixed by the matching authorities 12a-c.

The core of private stable matching proceeds in n rounds. Let $E_k$ denote the set of engaged or matched bids and $F_k$ denote the set of free bids or unmatched bids at the beginning of round k=1, ..., n+1. The rounds of stable matches are iteratively executed for k=1, ..., n (blocks 66-68). During each round (block 66), stable matches are determined (block 67), as further described below with reference to FIG. 10. After n rounds (block 68), the final set $E_{n+1}$ includes n engaged bids of the form $(W_i, E(j), E(s_{j,i}))$, where $W_i=[E(i), a_i, v_i, q_i, E(p)]$. The matching authorities 12a-c retain only two ciphertexts from an engaged bid, E(i) and E(j) (block 69), and thus obtain n pairs of the form (E(i); E(j)). These pairs (E(i); E(j)) are externally mixed by the matching authorities (block 70) and jointly decrypted (block 71). The decryption of pair (E(i); E(j)) reveals each man $A_i$ that is paired with a woman $B_j$.

Input Submission

Figure 8:
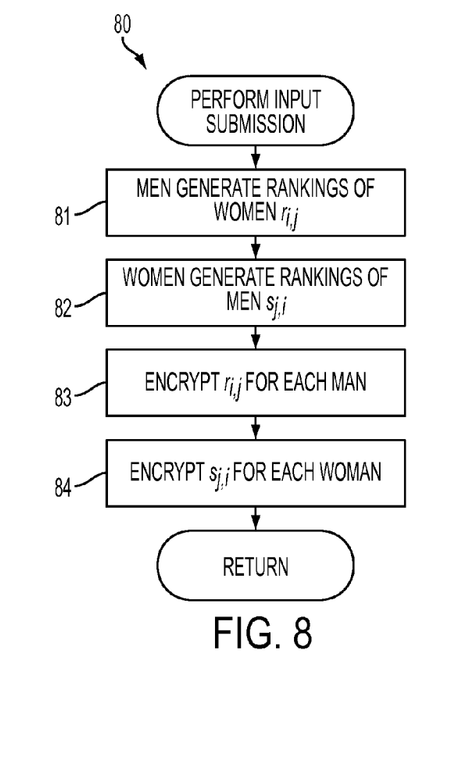
FIG. 8 is a flow diagram showing a routine for performing an input submission for use in the method of FIGS. 7A-B.

As inputs to the method, every man $A_i$ ranks all women and every woman $B_j$ ranks all men, with no ties allowed by either. FIG. 8 is a flow diagram showing a routine 80 for performing an input submission for use in the method of FIGS. 7A-B. As before, let $r_{i,j} \in \{0, \ldots, n-1\}$ denote the rank of woman $B_j$ for man $A_i$ (block 81) and let $s_{j,i} \in \{0, \ldots, n-1\}$ denote the rank of man $A_i$ for woman $B_j$ (block 82). To encrypt their preferences, every man $A_i$ submits a vector of n Paillier ciphertexts $a_i=(p_{i,1}, \ldots, p_{i,n})$, where $p_{i,j}=E(r_{i,j})$ (block 83). Similarly, to encrypt their preferences, every woman $B_j$ submits a vector of n Paillier ciphertexts $b_j=(q_{j,1} \ldots, q_{j,n})$, where $q_{j,i}=E(s_{j,i})$ (block 84).

Preprocessing

Figure 9:
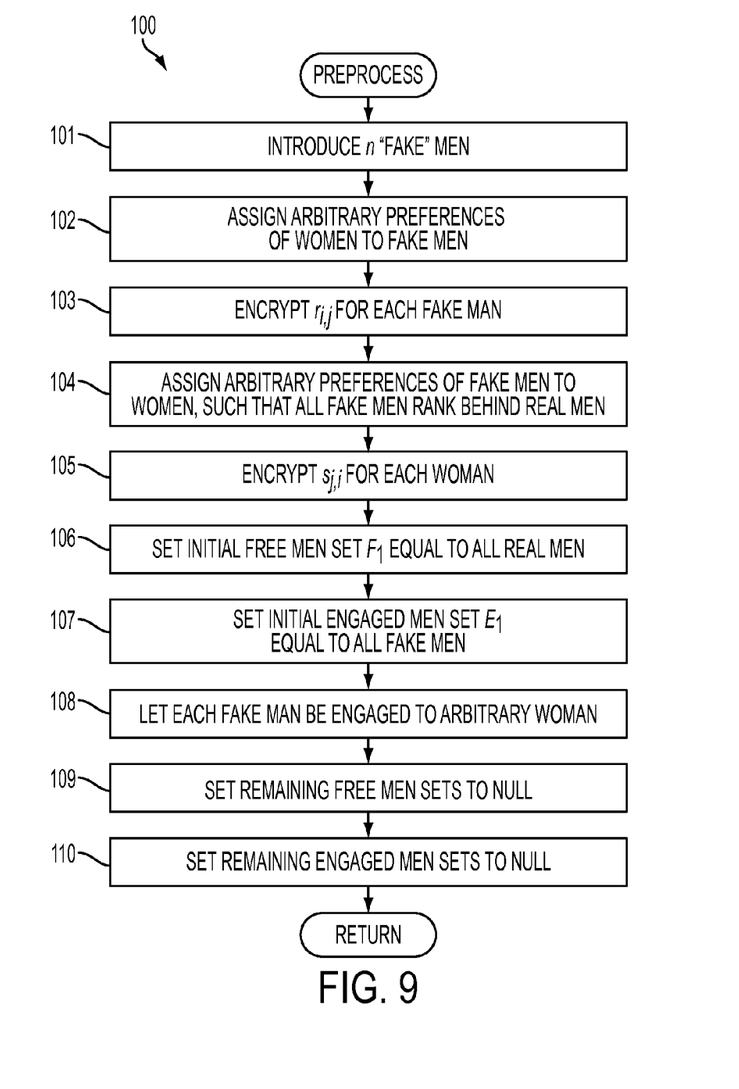
FIG. 9 is a flow diagram showing a routine for performing preprocessing for use in the method of FIGS. 7A-B.

"Fake" men are used to help conceal interim information during private stable matching. FIG. 9 is a flow diagram showing a routine 100 for performing preprocessing for use in the method of FIGS. 7A-B. The matching authorities 12a-c define an additional n fake men $A_{n+1}, \ldots, A_{2n}$ (block 101). Specifically, the matching authorities define $r_{i,j}=j-i+n \mod (n-1)$ for $i \in \{n+1, \ldots, 2n\}$ and $j \in \{1, \ldots, n\}$ to assign arbitrary preferences of women to fake men (block 102). The corresponding vectors $a_i=(p_{i,1}, \ldots, p_{i,n})$ for i=n+1, ..., 2n, where $p_{i,j}=E(r_{i,j})$, are determined to encrypt the "preferences" of each fake man for women (block 103). Similarly, the matching authorities 12a-c also define $s_{j,i}=i-1$ for $j \in \{1, n\}$ and $i \in \{n+1, 2n\}$ and augment the vectors $b_j$ with these new values, where $b_j=(q_{j,1}, \ldots, q_{j,2n})$, to respectively assign "preferences"

of each woman for fake men (block 104), such that each fake man is less preferred than each real man, and to encrypt these "preferences" (block 105). Following the creation of the fake men and encryption of the corresponding preferences, the matching authorities have 2n vectors $a_1, \ldots, a_{2n}$, where each vector contains n ciphertexts that express the rankings assigned by one man to the n women and n vectors $b_1, \ldots, b_n$, where each vector contains 2n ciphertexts that express the rankings assigned by one woman to the 2n men.

Preliminary to determining the stable matches, the initial set of free men $F_1$ is set to the set of all real men $A_1, \ldots, A_n$ (block 106). The initial set of engaged men $E_1$ is set to the set of all fake men $A_{n+1}, \ldots, A_{2n}$ (block 107), where each fake man $A_{n+j}$, where $j \in \{n+1, \ldots, 2n\}$, is "engaged" to woman $B_j$ (block 108). Finally, the other sets are initially empty, where $E_k = F_k = \emptyset$ for k>1 (blocks 109 and 110).

Determining Stable Matchings

Figure 10:
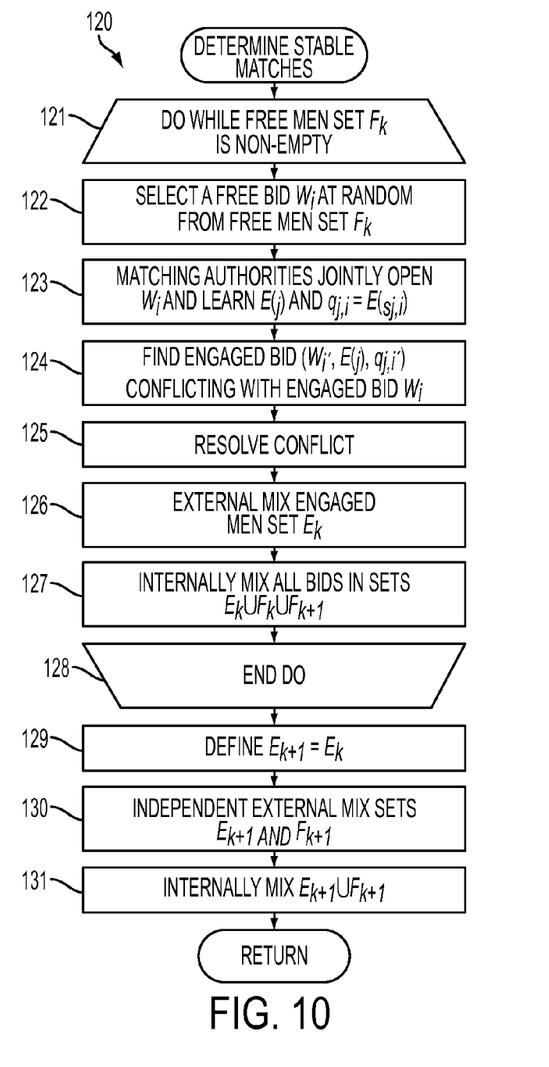
FIG. 10 is a flow diagram showing a routine for determining stable matchings for use in the method of FIGS. 7A-B.

Private stable matching proceeds in a manner similar to the non-private form described above, but operates on encrypted bids to preserve privacy. FIG. 10 is a flow diagram showing a routine 120 for determining stable matchings for use in the method of FIGS. 7A-B. The core of private stable matching algorithm proceeds in n rounds. Each round k for k=1, . . . , n, stable matching proceeds iteratively while the set $F_k$ is non-empty (blocks 121-128).

At the start of each round (block 121), one free bid $W_i$ is selected at random from $F_k$ (block 122). The matching authorities 12a-c jointly open up bid $W_i$, and learn E(j) and $q_{j,i} = E(s_{j,i})$ (block 123). As there is always exactly one engaged bid in $E_k$ that conflicts with $W_i$, the matching authorities jointly find that engaged bid using the protocol for detecting a conflict, described above, at most $|E_k|$=n times (block 124). The conflicting engaged bid is called ($W_{i'}$, E(j), $q_{j,i'}$). Using the protocol for resolving a conflict, described above, the matching authorities 12a-c resolve the conflict (block 125). The conflict resolution protocol does not reveal which bid wins but ensures that one bid, either $W_i$ or $W_{i'}$, is added to $E_k$ and the other bid is added to $F_{k+1}$. For clarity of discussion, if $W_i$ wins, $W_i$ becomes an engaged bid ($W_i$, E(j), $E(s_{j,i})$) and is moved from the set $F_k$ to the set $E_{k'}$, the engagement of bid ($W_{i'}$, E(j), $E(s_{j,i'})$) is broken, and the newly free bid $W_{i'}$ moves from the set $E_k$ to $F_{k+1}$. Otherwise, if $W_i$ loses, $W_i$ remains free and moves from $F_k$ to $F_{k+}$, and the engaged bid ($W_{i'}$, E(j), $E(s_{j,i'})$) stays in the set $E_{k'}$. The set $E_k$ is mixed externally (block 126). All bids in the sets $E_k \cup F_k \cup F_{k+1}$ are then mixed internally (block 127).

At the end of each round, that is, when the set $F_k$ is empty (block 128), $E_{k+1} = E_k$ (block 129). The sets $E_{k+1}$ and $F_{k+1}$ are independently mixed externally (block 130). The set $E_{k+1} \cup F_{k+1}$ is then mixed internally (block 131).

Properties

For purpose of completeness, the properties exhibited by the stable matching method are described.

Proposition 2.

The stable matching method terminates after n rounds and outputs a stable matching between n real men and n real women. The computational cost of the algorithm is dominated by the cost of running $3n^2$ re-encryption mix networks on at most 2n Paillier ciphertexts. The corresponding communication cost is $O(n^3)$.

Since an honest-but-curious passive adversary is assumed, the proof of correctness follows directly from Proposition 1, described above. The computational cost is dominated by the cost of re-encryption mix networks. For every element in $F_k$ in every round k, the matching authorities must run three re-encryption mix networks, which include one network to resolve the conflict between bids, one network for external mixing, and one network for internal mixing. The overall computational cost is thus $O(n^3)$ modular exponentiations. This cost is substantial, but not unreasonable, considering that stable matching algorithms are typically run off-line and that low latency is not a requirement. In practice, stable matching algorithms involving a few thousand participants could be run privately within a day on commodity hardware.

Proposition 3.

The private stable matching method is private according to Definition 1, assuming Paillier encryption is semantically secure and the underlying re-encryption mix network is private.

Active Adversaries

The private stable matching method can be extended to accommodate active adversaries at the cost of additional proofs of correct execution. Consider an active adversary who has static control over up to all of the participants, both men and women, and has static control of up to a strict minority of the matching authorities. The private stable matching method must be augmented with proofs of correct protocol execution by participants and matching authorities. These proofs are verified by the matching authorities, where a strict majority are assumed honest.

The participants need only prove to the matching authorities that the preference vectors they submit, $a_i$ for man $A_i$ and $b_j$ for woman $B_j$, follow the protocol specifications, that is, are Paillier encryptions of a permutation of the set $\{0, \ldots, n-1\}$. Using non-interactive zero-knowledge (NIZK) proofs that the decryption $E^{-1}$ (C) of a Paillier ciphertext C lies within a given plaintext set $\{0, \ldots, n-1\}$, for Paillier encryption, these proofs reduce to proving knowledge of the root of the randomization factor, such as described in I. Damgård, supra, and O. Baudron et al., "Practical Multi-Candidate Election System," *Proc. of the ACM PODS* 2001, pp. 274-283 (2001), the disclosures of which are incorporated by reference. These proofs can also be combined conjunctively and disjunctively using standard techniques, such as described in R. Cramer et al., "Proofs of Partial Knowledge and Simplified Design of Witness Hiding Protocols," *Proc. of Crypto.* 1994 (1994), the disclosures of which are incorporated by reference. A proof that a vector $a_i = (E(r_1), \ldots, E(r_n))$ is well-formed can be proven with the following NIZK proof:

$$\bigwedge_{j \in \{0, \ldots, n-1\}} \left( \bigvee_{i \in \{0, \ldots, n\}} (E^{-1}(E(r_i)) = j) \right)$$

The correct behavior of matching authorities must itself be verified. The cryptographic building blocks, described above, all accept variants that are secure against active adversaries. A matching authority caught not following the protocol is excluded from future computations and replaced by a new authority.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system providing private stable matchings, comprising:
   a digital data storage, comprising:
   indices assigned to each active participant in a group of active participants and to each of passive participant in a group of passive participants, at least one set of active participant preferences for an active participant, the active participant preferences set comprising rankings of the indices assigned to the passive participants that the active participant prefers;

at least one set of passive participant preferences for a passive participant, the passive participant preferences set comprising rankings of the indices assigned to each of those active participants that the passive participant prefers;

an encrypted active participant preferences set comprising an encryption of the at least one active participant preferences set; and an encrypted passive participant preferences set comprising an encryption of the at least one passive participant preferences set; and a processor comprising computer-executable instructions stored in a non-transitory computer readable medium, wherein execution of the instructions by the processor causes the processor to perform the steps of:

pairing together and encrypting the indices of each of the active participants and each of the passive participants as private stable matched bids from the at least one active participant preferences set and the at least one passive participant preferences set;

forming unmatched bids and permuting the encrypted active participant preferences set;

determining for the number of active participants, the stable matching between the active participant and the passive participant, while the unmatched bids remain unmatched, comprising further steps of:

selecting one of the unmatched bids and learning the active participant preference in the unmatched bid and the passive participant preference for the passive participant identified in the active participant preference in the unmatched bid;

resolving a conflict between the unmatched bid and a matched bid that comprises an active participant preference that identifies the same passive participant that is identified in the active participant preference in the unmatched bid; and assigning one of the unmatched bid and the matched bid to the matched bids and the other bid to the unmatched bids for a next stable matching, and designating the matched bids for the next stable matching; and decrypting at least one of the private matched bids as a stable matching, and decrypting the active participant preferences set in the matched bids for the last stable matching to identify the passive participants stably matched to the active participants, which are presented to one of the passive participant and the active participant identified in the decrypted stable matching.

2. A computer-implemented system according to claim 1, wherein the processor further performs a step of privately generating private stable unmatched bids from the at least one active participant preferences set and the at least one passive participant preferences set, each private stable unmatched bid comprising the index of one of the passive participants and the index of one of the active participants, wherein the index of the passive participant and the index of the active participate are not paired up and which are both encrypted.

3. A computer-implemented system according to claim 1, wherein the processor further performs a step of determining the active participant preference in the unmatched bid and the passive participant preference for the passive participant identified in the active participant preference by evaluating the indices comprised in the encrypted active participant preferences set based on the rankings comprised in the passive participant preferences set.

4. A computer-implemented system according to claim 1, wherein the processor further performs a step of identifying a stable matching between the passive participant identified in the active participant preference in one of the unmatched bids and the passive participant identified in the active participant preference in one of the matched bids by evaluating equivalence of the active participant preferences in encrypted form.

5. A computer-implemented system according to claim 1, wherein the processor further performs steps of encrypting the unmatched bid as one such matched bid and the matched bid as one such unmatched bid for the next stable matching, conditioned upon the active participant for the active participant preference in the unmatched bid being preferred by the passive participant identified in the active participant preference in the unmatched bid than the active participant for the active participant preference in the matched bid and encrypting the matched bid as one such matched bid and the unmatched bid as one such unmatched bid for the next stable matching, conditioned upon the active participant for the active participant preference in the matched bid being preferred by the passive participant identified in the active participant preference in the unmatched bid than the active participant for the active participant preference in the unmatched bid.

6. A computer-implemented system according to claim 1, wherein the processor further performs steps of designating the unmatched bid as one such matched bid and the matched bid as one such unmatched bid for the next stable matching after the conflict is resolved in favor of the unmatched bid and designating the unmatched bid as one such unmatched bid for the next stable matching after the conflict is resolved in favor of the matched bid.

7. A computer-implemented system according to claim 1, wherein the storage further comprises encrypted pseudo preferences for pseudo participants uniquely identifying preferences for passive participants and encrypted passive participant preferences for the passive participants uniquely identifying preferences for the pseudo participants, such that each pseudo preference is less preferred than each active participant preference, wherein matched bids are formed by permuting the encrypted pseudo preferences.

8. A computer-implemented system according to claim 7, wherein the processor further performs a step of performing external mixing by concealing which of the matched bids and the unmatched bids encodes the preferences of each active participant and each pseudo participant.

9. A computer-implemented system according to claim 7, wherein the processor further performs a step of performing internal mixing by concealing the passive participants to which each encrypted preference pertains.

10. A computer-implemented system according to claim 1, wherein the processor further performs steps of performing encryption under a threshold public-key encryption scheme with additive homomorphism and assigning a private decryption key for the encryption scheme to a plurality of matching authorities.

11. A computer-implemented method for providing private stable matchings, comprising:

assigning indices into a digital data storage to each active participant in a group of active participants and to each of passive participant in a group of passive participants;

accumulating into the digital data storage at least one set of active participant preferences for an active participant and at least one set of passive participant preferences for a passive; participant, the active participant preferences set comprising rankings of the indices assigned to the passive participants that the active participant prefers, the passive participant preferences set comprising rankings of the indices assigned to each of those active participants that the passive participant prefers;

accumulating into the digital data storage an encrypted active participant preferences set comprising an encryption of the at least one active participant preferences set and an encrypted passive participant preferences set comprising an encryption of the at least one passive participant preferences set;

pairing together and encrypting on a matching authority system the indices of each of the active participants and each of the passive participants as private stable matched bids from the at least one active participant preferences set and the at least one passive participant preferences set;

forming on the matching authority system unmatched bids by permuting the encrypted active participant preferences set;

determining, for the number of active participants, on the matching authority system the stable matching between the active participant and the passive participant, while the unmatched bids remain unmatched, comprising:
 selecting on the matching authority system one of the unmatched bids and learning the active participant preference in the unmatched bid and the passive participant preference for the passive participant identified in the active participant preference in the unmatched bid; and
 resolving on the matching authority system a conflict between the unmatched bid and a matched bid that comprises an active participant preference that identifies the same passive participant that is identified in the active participant preference in the unmatched bid; and
 assigning on the matching authority system one of the unmatched bid and the matched bid to the matched bids and the other bid to the unmatched bids for a next stable matching, and designating the matched bids for the next stable matching; and decrypting on the matching authority system at least one of the private matched bids as a stable matching, and decrypting on the matching authority system the active participant preferences in the matched bids for the last stable matching to identify the passive participants stably matched to the active participants, which are presented to one of the passive participant and the active participant identified in the decrypted stable matching.

12. A computer-implemented method according to claim 11, further comprising:
 privately generating on the matching authority system private stable unmatched bids from the at least one active participant preferences set and the at least one passive participant preferences set, each private stable unmatched bid comprising the index of one of the passive participants and the index of one of the active participants, wherein the index of the passive participant and the index of the active participant are not paired up and which are both encrypted.

13. A computer-implemented method according to claim 11, comprising:
 determining on the matching authority system the active participant preference in the unmatched bid and the passive participant preference for the passive participant identified in the active participant preference by evaluating the indices comprised in the encrypted active participant preferences set based on the rankings comprised in the passive participant preferences set.

14. A computer-implemented method according to claim 11, further comprising:
 identifying on the matching authority system a stable matching between the passive participant identified in the active participant preference in one of the unmatched bids and the passive participant identified in the active participant preference in one of the matched bids by evaluating equivalence of the active participant preferences in encrypted form.

15. A computer-implemented method according to claim 11, further comprising:
 performing on the matching authority system one of:
  encrypting the unmatched bid as one such matched bid and the matched bid as one such unmatched bid for the next stable matching, conditioned upon the active participant for the active participant preference in the unmatched bid being preferred by the passive participant identified in the active participant preference in the unmatched bid than the active participant for the active participant preference in the matched bid; and
  encrypting the matched bid as one such matched bid and the unmatched bid as one such unmatched bid for the next stable matching, conditioned upon the active participant for the active participant preference in the matched bid being preferred by the passive participant identified in the active participant preference in the unmatched bid than the active participant for the active participant preference in the unmatched bid.

16. A computer-implemented method according to claim 11, further comprising:
 performing on the matching authority system one of:
  designating the unmatched bid as one such matched bid and the matched bid as one such unmatched bid for the next stable matching after the conflict is resolved in favor of the unmatched bid; and
  designating the unmatched bid as one such unmatched bid for the next stable matching after the conflict is resolved in favor of the matched bid.

17. A computer-implemented method according to claim 11, further comprising:
 encrypting on the matching authority system pseudo preferences for pseudo participants uniquely identifying preferences for passive participants and encrypting passive participant preferences for the passive participants uniquely identifying preferences for the pseudo participants, such that each pseudo preference is less preferred than each active participant preference; and
 forming on the matching authority system matched bids by permuting the encrypted pseudo preferences.

18. A computer-implemented method according to claim 17, further comprising:
 performing on the matching authority system external mixing by concealing which of the matched bids and the unmatched bids encodes the preferences of each active participant and each pseudo participant.

19. A computer-implemented method according to claim 17, further comprising:
 performing on the matching authority system internal mixing by concealing the passive participants to which each encrypted preference pertains.

20. A computer-implemented method according to claim 11, further comprising:
  performing on the matching authority system encryption under a threshold public-key encryption scheme with additive homomorphism; and
  jointly assigning on the matching authority system a private decryption key for the encryption scheme to a plurality of matching authorities.

* * * * *